United States Patent
Furuichi (10) Patent No.: US 10,420,003 B2
(45) Date of Patent: Sep. 17, 2019

(54) BASE STATION APPARATUS, COMMUNICATION SYSTEM AND COMMUNICATION METHOD

(71) Applicant: NEC CORPORATION, Tokyo (JP)

(72) Inventor: Hideyuki Furuichi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 60 days.

(21) Appl. No.: 15/559,688

(22) PCT Filed: Mar. 17, 2016

(86) PCT No.: PCT/JP2016/001547
§ 371 (c)(1),
(2) Date: Sep. 19, 2017

(87) PCT Pub. No.: WO2016/152114
PCT Pub. Date: Sep. 29, 2016

(65) Prior Publication Data
US 2018/0255497 A1    Sep. 6, 2018

(30) Foreign Application Priority Data

Mar. 23, 2015   (JP) ................ 2015-059386

(51) Int. Cl.
*H04W 36/32* (2009.01)
*H04W 16/18* (2009.01)
(Continued)

(52) U.S. Cl.
CPC .......... *H04W 36/32* (2013.01); *H04B 7/0617* (2013.01); *H04B 17/27* (2015.01);
(Continued)

(58) Field of Classification Search
CPC ... H04W 36/32; H04W 64/006; H04W 16/28; H04W 16/18; H04W 24/06; H04B 17/27; H04B 7/0617; H04B 17/382
See application file for complete search history.

(56) References Cited

U.S. PATENT DOCUMENTS

| | | | |
|---|---|---|---|
| 2003/0114195 A1 | 6/2003 | Chitrapu et al. | |
| 2010/0113002 A1 | 5/2010 | Joko et al. | |
| (Continued) | | | |

FOREIGN PATENT DOCUMENTS

| | | | |
|---|---|---|---|
| JP | 2001-168784 A | 6/2001 | |
| JP | 2005-236818 A | 9/2005 | |
| (Continued) | | | |

OTHER PUBLICATIONS

International Search Report for PCT/JP2016/001547 dated Apr. 26, 2016 [PCT/ISA/210].
(Continued)

*Primary Examiner* — Jae Y Lee
(74) *Attorney, Agent, or Firm* — Sughrue Mion, PLLC (57) ABSTRACT

In order to prevent degradation in communication quality at the time of handover, this base station apparatus is provided with: an antenna; and a cell forming unit that receives, from another base station apparatus, information indicating the movement state of a mobile station apparatus accommodated in the other base station apparatus and forms a cell on the basis of the information by using the antenna.

3 Claims, 8 Drawing Sheets

(51) Int. Cl.
　　　*H04W 16/28*　　(2009.01)
　　　*H04B 17/382*　　(2015.01)
　　　*H04B 7/06*　　(2006.01)
　　　*H04W 64/00*　　(2009.01)
　　　*H04B 17/27*　　(2015.01)
　　　*H04W 24/06*　　(2009.01)

(52) U.S. Cl.
　　　CPC .......... *H04B 17/382* (2015.01); *H04W 16/18* (2013.01); *H04W 16/28* (2013.01); *H04W 64/006* (2013.01); *H04W 24/06* (2013.01)

(56) References Cited

U.S. PATENT DOCUMENTS

| | | | |
|---|---|---|---|
| 2010/0291931 A1 | 11/2010 | Suemitsu et al. | |
| 2014/0148173 A1 | 5/2014 | Karaoguz | |
| 2014/0204926 A1* | 7/2014 | Ota | H04W 84/12 |
| | | | 370/338 |
| 2016/0323756 A1* | 11/2016 | Shen | H04W 16/28 |

FOREIGN PATENT DOCUMENTS

| | | |
|---|---|---|
| JP | 2005-536905 A | 12/2005 |
| JP | 2006-170698 A | 6/2006 |
| JP | 2008-035287 A | 2/2008 |
| WO | 2009/057544 A1 | 5/2009 |

OTHER PUBLICATIONS

Written Opinion for PCT/JP2016/001547 dated Apr. 26, 2016 [PCT/ISA/237].

\* cited by examiner

BASE STATION APPARATUS, COMMUNICATION SYSTEM AND COMMUNICATION METHOD

CROSS REFERENCE TO RELATED APPLICATIONS

This application is a National Stage of International Application No. PCT/JP2016/001547 filed Mar. 17, 2016, claiming priority based on Japanese Patent Application No. 2015-059386 filed Mar. 23, 2015, the contents of all of which are incorporated herein by reference in their entirety.

TECHNICAL FIELD

The present invention relates to base station apparatuses and, more particularly, to a base station apparatus that forms a cell using a beam forming method.

BACKGROUND ART

Among base station apparatuses, there are base station apparatuses capable of forming a cell, that is, a range within which their radio waves reach, using a beam forming method. The beam forming method is a method of sending radio waves only to a particular mobile station apparatus by limiting a range within which radio waves reach using an array antenna such as an adaptive array antenna, and has an advantage of being capable of enhancing communication quality (for example, Qos (Quality of Service)) by reducing radio wave interferences to other mobile station apparatuses. Further, the base station apparatus is also capable of changing the shape of a cell in response to the movement of a mobile station apparatus using the beam forming method (see PTL 1). Further, in PTL 2, there is described a technology that allows the directivity of a base station to follow the movement of a mobile station.

CITATION LIST

Patent Literature

[PTL 1] Japanese Unexamined Patent Application Publication No. 2006-170698
[PTL 2] Japanese Unexamined Patent Application Publication No. 2001-168784

SUMMARY OF INVENTION

Technical Problem

When handover for switching a base station apparatus that becomes a destination of communication of a mobile station apparatus has been performed between base station apparatuses supporting the beam forming method, a base station apparatus that is the destination of the switching acquires the location and the like of the mobile station apparatus after the execution of handover and forms a cell in accordance with the beam forming method. Thus, even in a state in which a mobile station apparatus is enjoying a service using the beam forming method through a pre-switching base station apparatus, upon execution of handover, the mobile station apparatus temporarily cannot enjoy the service using the beam forming method, and this may pose a problem of communication quality degradation. Note that there is no description in relation to handover in PTLs 1 and 2, and this problem cannot be solved.

An object of the present invention is to provide a base station apparatus, a communication system, and a communication method that are capable of suppressing the degradation of communication quality at the time of handover.

Solution to Problem

A first base station apparatus according to the present invention is a base station apparatus including an antenna and a cell formation section for receiving, from another base station apparatus, information indicating a movement status of a mobile station apparatus being served by the another base station apparatus, and for forming a cell based on the information using the antenna.

A second base station apparatus according to the present invention is a base station apparatus including an antenna for receiving a radio wave and a motion measurement section for calculating a movement status of a mobile station device being served by the base station apparatus based on the radio wave, and for transmitting information indicating the movement status to another base station apparatus.

A communication system according to the present invention is a communication system including a first base station apparatus and a second base station apparatus, the first base station apparatus including a first antenna for receiving a radio wave and a motion measurement section for calculating a movement status of a mobile station apparatus being served by the base station apparatus based on the radio wave, and for transmitting information indicating the movement status to the second base station apparatus, the second base station apparatus including a second antenna and a cell formation section for receiving the information from the first base station apparatus, and for forming a cell based on the information using the second antenna.

A first communication method according to the present invention is a communication method for use in a base station apparatus, the communication method including receiving, from another base station apparatus, information indicating a movement status of a mobile station apparatus being served by the another base station apparatus, and forming a cell based on the information.

A second communication method according to the present invention is a communication method for use in a base station apparatus, the communication method including calculating a movement status of a mobile station apparatus being served by the base station apparatus based on a received radio wave, and for transmitting information indicating the movement status to another base station apparatus.

Advantageous Effects of Invention

According to the present invention, it is possible to suppress the degradation of communication quality at the time of the execution of handover.

DESCRIPTION OF EMBODIMENTS

Hereinafter, example embodiments of the present invention will be described with reference to the drawings. Note that, in the following description, components having the same function will be denoted by the same reference sign, and the description thereof may not be repeated.

Figure 1:
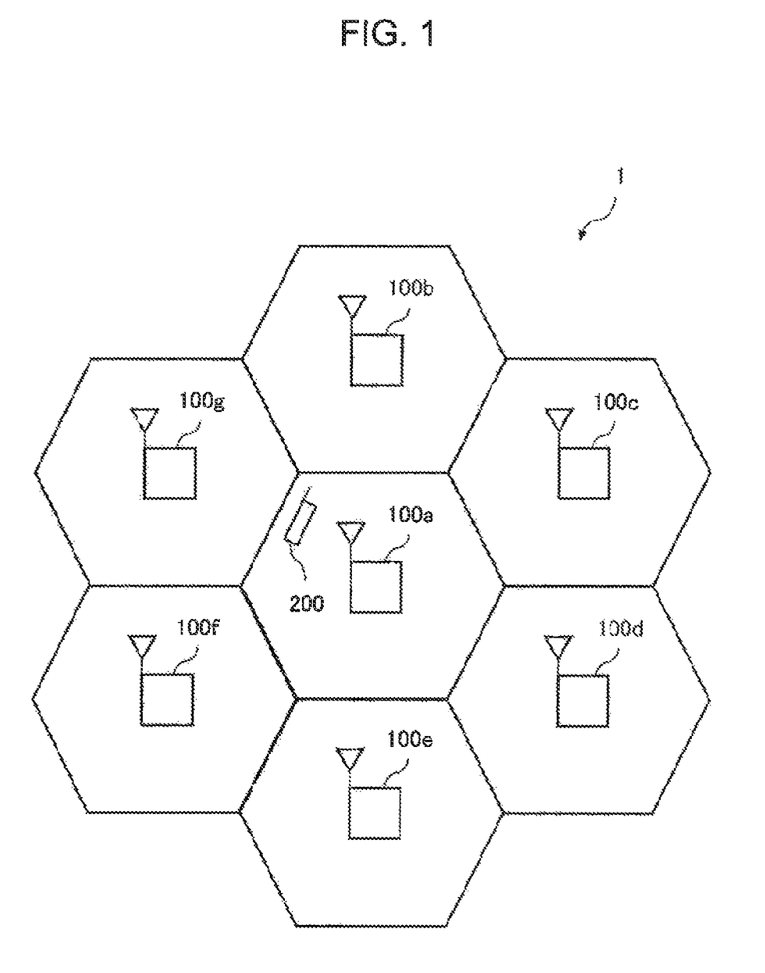
FIG. 1 is a conceptual diagram illustrating a communication system according to a first example embodiment of the present invention.

FIG. 1 is a conceptual diagram illustrating a communication system according to a first example embodiment of the present invention. As shown in FIG. 1, a communication system 1 includes base station apparatuses 100a to 100g and a mobile station apparatus 200.

The base station apparatuses 100a to 100g are capable of dynamically changing their cells using the beam forming method. In the present example embodiment, the cell is assumed to be a so-called microcell, but is not limited to the microcell.

The base station apparatuses 100a to 100g each perform radio communication with one or more mobile station apparatuses that each base station apparatus serves. In an example of FIG. 1, the base station apparatus 100a serves the mobile station apparatus 200. Further, the base station apparatuses 100a to 100g are connected to one another via unillustrated inter-base-station networks, and transmit/receive predetermined information to/from one another to thereby perform various processes, such as handover of the mobile station apparatus 200. In the present example embodiment, all of the base station apparatuses 100a and 100g have the same function.

Figure 2:
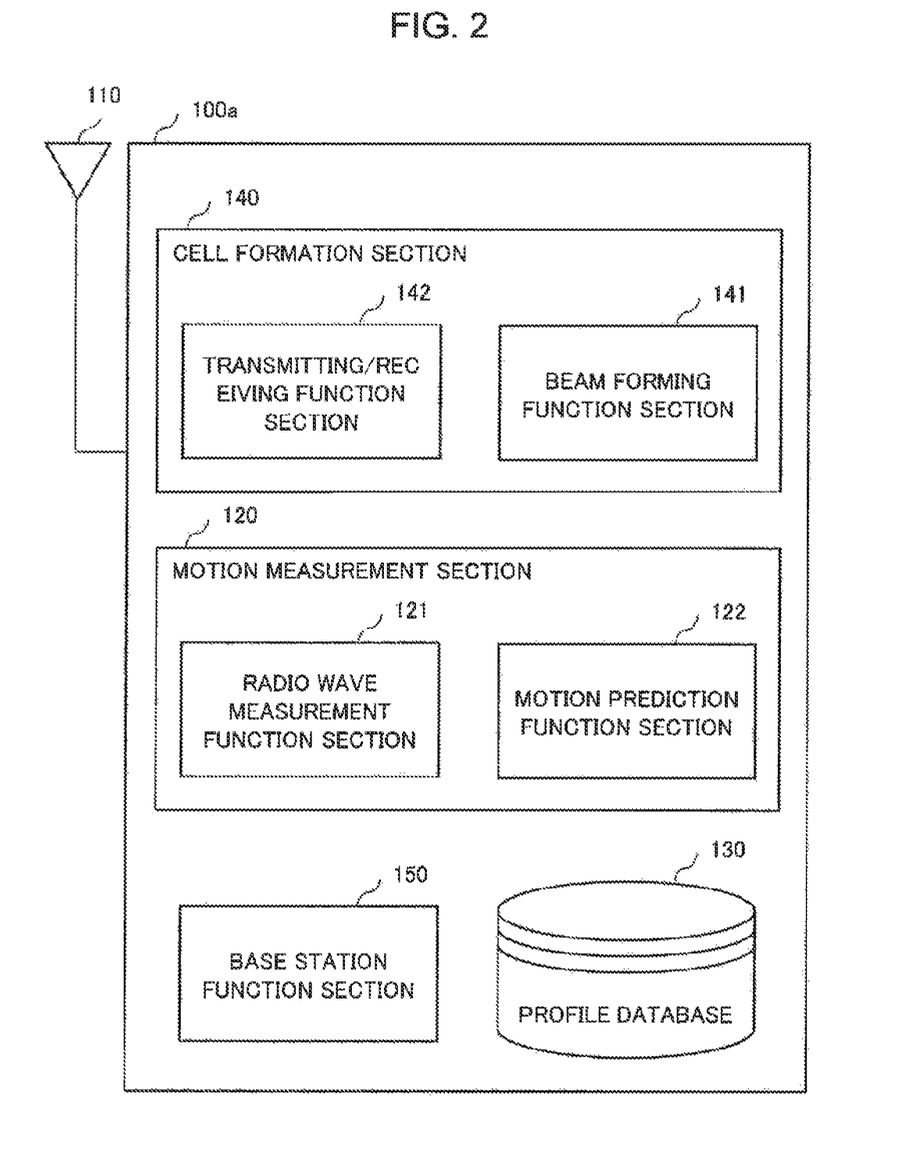
FIG. 2 is a block diagram illustrating a configuration of a base station apparatus in a first example embodiment of the present invention.

Hereinafter, the configuration of each of the base station apparatuses 100a to 100g will be described by taking the base station apparatus 100a as an example. FIG. 2 is a block diagram illustrating the configuration of the base station apparatus 100a. The base station apparatus 100a shown in FIG. 2 includes an antenna 110, a motion measurement section 120, a profile database 130, a cell formation section 140, and a base station function section 150.

The antenna 110 transmits/receives radio waves. In the present example embodiment, the base station apparatus 100a dynamically changes a cell using a beam forming method, and thus, as the antenna 110, an antenna whose directivity is controllable, that is, specifically, an array antenna such as an adaptive array antenna or the like, is used. Here, the array antenna is an antenna including a plurality of antenna elements.

The motion measurement section 120 calculates a movement status of the mobile station apparatus 200, which is being served by the base station apparatus 100a, based on the radio waves having been received by the antenna 110, and transmits movement information, that is, information indicating the calculated movement status, to other base station apparatuses. Specifically, the motion measurement section 120 includes a radio wave measurement function section 121 and a motion prediction function section 122.

The radio wave measurement function section 121 periodically measures the phases and the amplitudes of the respective radio waves having been received by the respective antenna elements of the antenna 110.

The motion prediction function section 122 calculates a movement status of the mobile station apparatus 200, which is being served by the base station apparatus 100a, based on the phases and the amplitudes of the respective radio waves having been measured by the radio wave measurement function section 121, and transmits movement information, that is, information indicating the movement status, to other base station apparatuses. The other base station apparatuses to which the movement information is transmitted are base station apparatuses adjacent to the base station apparatus 100a. Specifically, the adjacent base station apparatuses are base station apparatuses that may become the destinations of handover of the mobile station apparatus 200, which is being served by the base station apparatus 100a, and in the example of FIG. 1, the adjacent base station apparatuses are the base station apparatuses 100b to 100g. Alternatively, the motion prediction function section 122 may select a candidate for a base station apparatus that is the destination of the handover from among the adjacent base station apparatuses 100b to 100g based on the movement information, and may transmit the movement information only to the selected base station apparatus.

The profile database 130 stores therein profile data that is information for forming a cell. The profile data indicates the association relations between locations at the periphery of the radio base station apparatus 100a and setting value sets each indicating the phases and the amplitudes of radio waves to be transmitted by the respective antenna elements of the antenna 110.

The locations at the periphery of the radio base station apparatus 100a include locations on a predetermined handover region. The handover region is a region located on or adjacent to the boundary between the base station apparatus 100a and the base station apparatuses 100b to 100g, which are located next to the base station 100a, and is a region within which the handover is estimated to occur and within which the handover has actually occurred. Each of the setting value sets indicates phases and amplitudes for forming a cell appropriate for serving a mobile station apparatus existing at one of the locations that is associated with the each of the setting value sets. Alternatively, each of the setting value sets may indicate the phases and the amplitudes themselves of radio waves to be transmitted by the respective antenna elements, or may indicate values from which the phases and the amplitudes can be calculated. Further, as each of the setting value sets, values that were actually measured at a corresponding one of the locations may be used, or values that were estimated by performing simulation analyses based on topography data and the like may be used. Further, the profile data may be generated and accumulated in the base station apparatus 100a as described below.

The cell formation section 140 receives, from another base station apparatus, movement information indicating a movement status of a mobile station apparatus being served by the another base station apparatus. The cell formation section 140 forms a cell based on the received movement information using the antenna 110. Specifically, the cell formation section 140 includes a beam forming function section 141 and a transmitting/receiving function section 142.

The beam forming function section 141 receives, from another base station apparatus, movement information indicating a movement status of a mobile station apparatus being served by the another base station apparatus. The beam forming function section 141 predicts, based on the received movement information, whether or not the mobile station apparatus being served by the another base station apparatus (hereinafter, this mobile station apparatus being referred to as an out-of-range mobile station apparatus) will arrive at the handover region described above.

In the case where it is predicted that the out-of-range mobile station apparatus will arrive at the handover region, the beam forming function section 141 estimates a predicted arrival location which exists within the handover region and at which the out-of-range mobile station apparatus is predicted to arrive, based on the movement information, and obtains a setting value set associated with the predicted arrival location from the profile database 130. At this time, the beam forming function section 141 may further estimate a predicted arrival time period to be taken until the arrival of the out-of-range mobile station apparatus at the handover region.

The transmitting/receiving function section 142 performs transmitting/receiving processing in relation to transmitting/receiving of radio waves via the antenna 110. For example, the transmitting/receiving function section 142 forms a cell using the antenna 110 in accordance with the beam forming method. Specifically, the transmitting/receiving function section 142 forms a cell by adjusting the phases and the amplitudes of radio waves to be transmitted from the respective antenna elements of the antenna 110 in accordance with the setting value set having been obtained by the beam forming function section 141. At this time, the transmitting/receiving function section 142 may form the cell at timing in accordance with the predicted arrival time period having been estimated by the beam forming function section 141.

The base station function section 150 performs processing that is needed as a base station apparatus in addition to the processing described above. For example, the base station function section 150 performs handover at predetermined timing.

Hereinafter, the operation of the communication system 1 according to the present example embodiment will be described.

Figure 3:
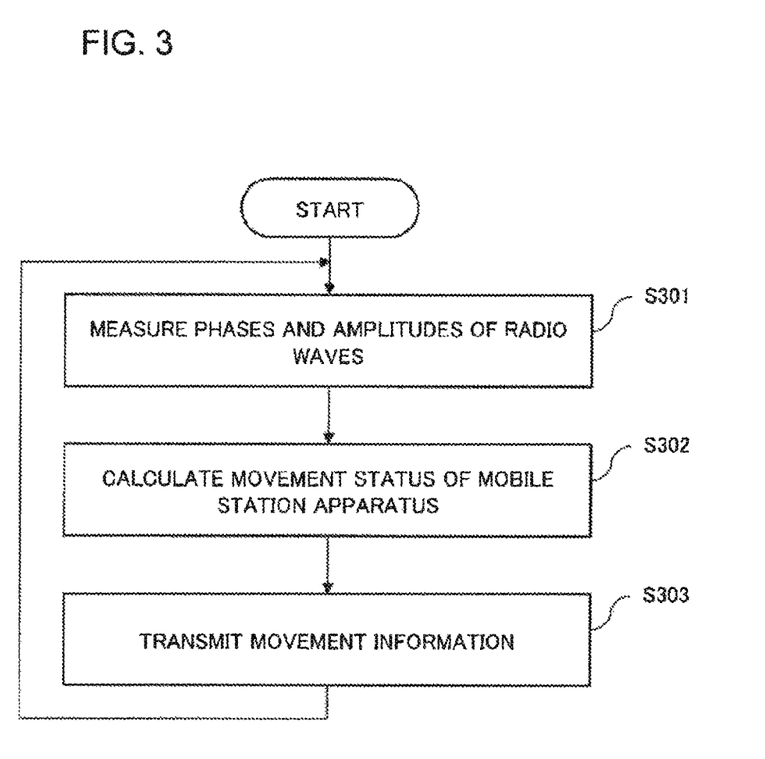
FIG. 3 is a flowchart for describing the operation of a base station apparatus that is a source of handover.

FIG. 3 is a flowchart for describing the operation of a radio base station apparatus at the side of transmitting the movement information (a radio base station apparatus serving the mobile station apparatus 200). In the following, it is assumed that the radio base station apparatus 100a serves the mobile station apparatus 200.

Firstly, in step S301, the radio wave measurement function section 121 of the radio base station apparatus 100a measures the phases and the amplitudes of radio waves having been received by the respective antenna elements of the antenna 110, and outputs the result of the measurement to the motion prediction function section 122. Subsequently, in step S302, the motion prediction function section 122 receives the result of the measurement, and calculates a movement status of the mobile station apparatus 200, which is being served by the radio base station apparatus 100a, based on the result of the measurement. Further, the motion prediction function section 122 generates movement information indicating the movement status, and transmits it to the other radio base station apparatuses.

Figure 4:
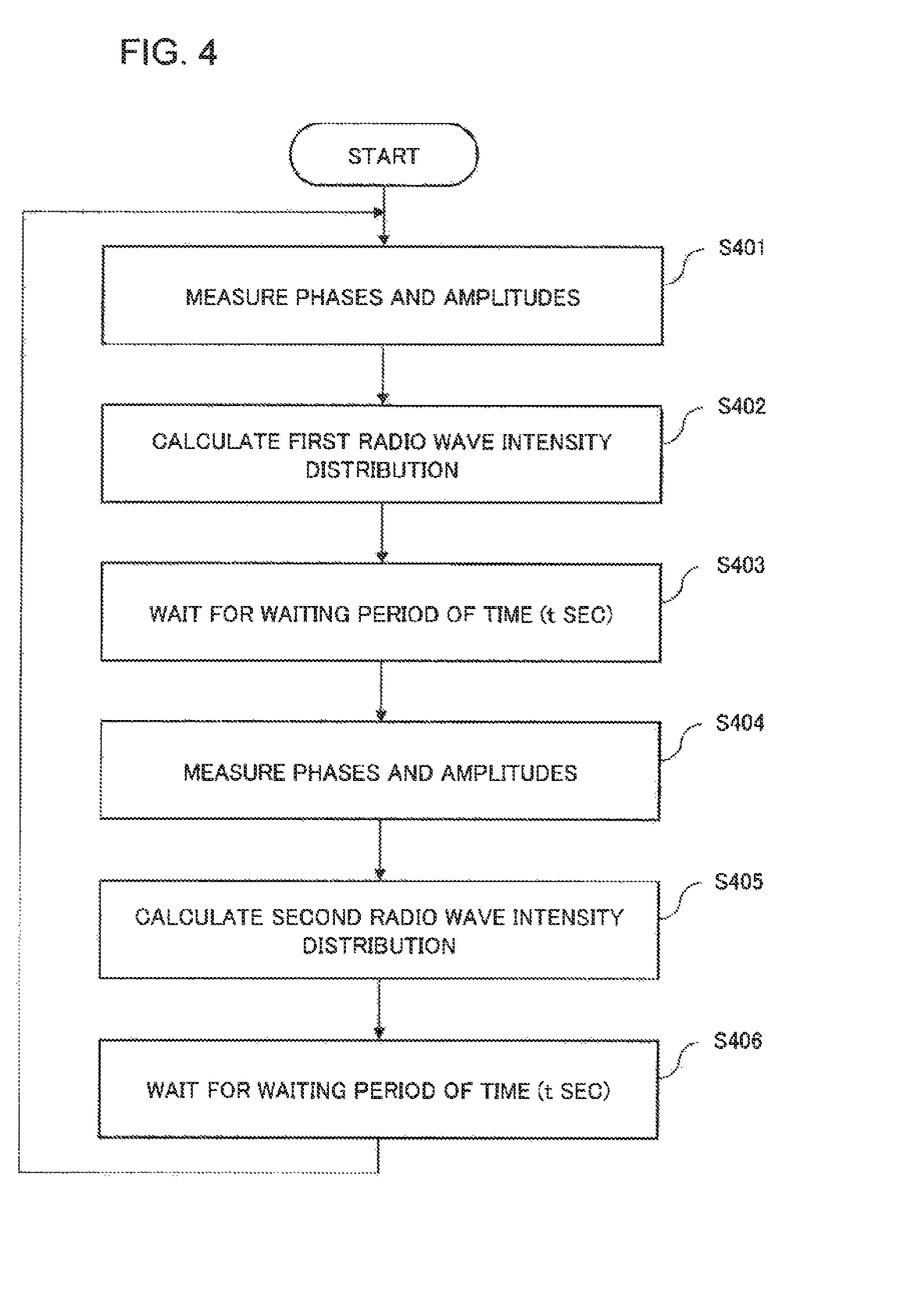
FIG. 4 is a flowchart for describing the operation of a radio wave measurement function section.

FIG. 4 is a flowchart for describing the operation of the radio wave measurement function section 121 in further detail.

Firstly, in step S401, the radio wave measurement function section 121 measures the phases and the amplitudes of radio waves having been received by the respective antenna elements of the antenna 110. Subsequently, in step S402, the radio wave measurement function section 121 calculates a first radio wave intensity distribution indicating the relations between locations at the periphery of the radio base station apparatus 100a and the intensities of radio waves being emitted from the locations, based on the measured phases and amplitudes, and outputs the first radio wave intensity distribution to the motion prediction function section 122 as the result of the measurement.

Thereafter, in step S403, the radio wave measurement function section 121 waits for a predetermined waiting period of time t [sec.]. The waiting period of time t is a period of time within which a cell can be appropriately formed in accordance with the movement of the mobile station apparatus 200, and is determined from, for example, an estimate value of the maximum movement speed of the mobile station apparatus 200, the frequencies of radio waves transmitted/received by the antenna 110, a processing time a of the execution of the process of step S402, and the like. Here, the estimate value of the maximum movement speed of the mobile station apparatus 200 can be set to, for example, 60 km/s on the assumption that a user toting the mobile station apparatus 200 travels by car.

When the waiting period of time t has passed, in step S404, the radio wave measurement function section 121 measures the phases and the amplitudes of radio waves having been received by the respective antenna elements of the antenna 110. Subsequently, in step S405, the radio wave measurement function section 121 calculates a second radio wave intensity distribution indicating the relations between the locations and the intensities of radio waves being emitted from the locations, based on the measured phases and amplitudes, and outputs the second radio wave intensity distribution to the motion prediction function section 122 as the result of the measurement. Thereafter, in step S406, the radio wave measurement function section 121 waits for the waiting period of time t, and returns to the process of step S402.

Figure 5:
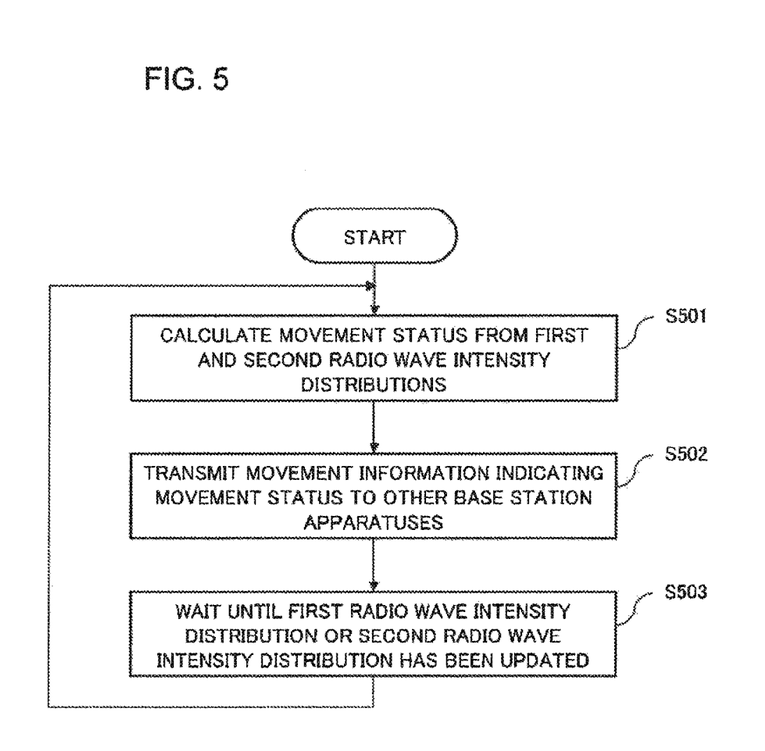
FIG. 5 is a flowchart for describing the operation of a motion prediction function section.

FIG. 5 is a flowchart for describing the operation of the motion prediction function section 122 in further detail.

Firstly, in step S501, the motion prediction function section 122 receives the first radio wave intensity distribution and the second radio wave intensity distribution that have been output from the radio wave measurement function section 121. The motion prediction function section 122 calculates a motion vector indicating the location, the movement direction, and the movement speed of the mobile station apparatus 200 as the movement status of the mobile station apparatus 200 based on the first radio wave intensity distribution and the second radio wave intensity distribution.

Subsequently, in step S502, the motion prediction function section 122 generates movement information indicating the movement status having been calculated in step S501, and transmits the movement information to the other base station apparatuses. Here, the motion prediction function section 122 may transmit the movement information to all of the adjacent base station apparatuses 100b to 100g as the other base station apparatuses, or may select a base station apparatus that will become the destination of the handover of the mobile station apparatus 200 from among the base station apparatuses 100b to 100g based on the movement information, and may transmit the movement information to the selected base station apparatus.

Further, in step S503, the motion prediction function section 122 waits until newly receiving the first radio wave intensity distribution or the second radio wave intensity distribution. Upon receipt of the first radio wave intensity distribution or the second radio wave intensity distribution, the motion prediction function section 122 returns to the process of step S501. Further, in step S501, the motion prediction function section 122 calculates the movement status using the first radio wave intensity distribution and the second radio wave intensity distribution that have been received successively to each other.

Hereinafter, a specific example of the method of the calculation of the motion vector in step S501 will be described. Note that the first and second radio wave intensity distributions may be either distributions of radio wave intensities on a two-dimensional plane or distributions of radio wave intensities on a three-dimensional space, and the following description will be made on the assumption that the first and second radio wave intensity distributions are the distributions of radio wave intensities on the two-dimensional plane (an x-axis direction and a y-axis direction). In the case where the distributions of radio wave intensities on the third dimensional space are used as the first and second radio wave intensity distributions, the motion vector can be calculated in a similar way by newly adding a z-axis direction in the following description.

The motion prediction function section 122 repeats a process of calculating a correlation coefficient between a distribution resulting from shifting a radio wave intensity distribution having been calculated first among the successively calculated first and second radio wave intensity distributions (in the following, this radio wave intensity distribution being assumed to be the first radio wave intensity distribution) and the second radio wave intensity distribution having been calculated later, the shifting of the first radio wave intensity distribution being shifting by a distance u in the x-axis direction and any distance v in the y-axis direction, the process of calculating the correlation coefficient being repeated while varying the distances u and v.

Further, the motion prediction function section 122 obtains distances u and v at which the correlation coefficient becomes largest, as the movement distances of the mobile station apparatus 200 in the respective x-axis direction and y-axis direction. Further, the motion prediction function section 122 obtains the sum of the above-described waiting period of time t and processing time a as an elapsed time. The motion prediction function section 122 obtains a movement direction and a movement speed of the mobile station apparatus 200 based on the movement distances u and v and the elapsed time. Moreover, the motion prediction function section 122 obtains a location at which the intensity in the second radio wave intensity distribution becomes a maximum value or can be estimated to be a maximum value, as the location of the mobile station apparatus 200.

Note that, in the case where a plurality of mobile station apparatuses exists, the motion prediction function section 122 may divide the radio wave intensity distribution for each of the mobile station apparatuses, and may perform the above-described calculation for each of the divided radio wave intensity distributions.

As another method of calculating the motion vector, the motion prediction function section 122 obtains data composed of radio wave intensity distributions at a plurality of time points (for example, the first and second radio wave intensity distributions) as moving image data. Specifically, the moving image data is obtained by associating a radio wave intensity distribution at each of the time points with one frame of the moving image data, associating the locations of the radio wave intensity distributions with pixel locations of the moving image data, and associating the intensities of the radio waves with pixel values of the moving image data. Further, the motion prediction function section 122 calculates the motion vector of the moving image data as the movement information. Here, the motion vector is used in moving image compression technologies and the like, and indicates an amount of shifting from the previous frame for each of predetermined pixel blocks. Each of the pixel blocks may be associated with a corresponding one of the locations, but is preferable to be associated with a corresponding one of regions located at the periphery of the base station apparatus 100a and having a certain degree of largeness. In this case, it is possible to reduce the amount of processing for obtaining, from the motion vector, the location, the movement direction, and the movement distance of each mobile station apparatus.

Additionally, in the case where the communication method of the radio communication performed by the radio base station apparatus 100a is a Time-Division Duplex (TDD) method, the profile data may be accumulated in the profile database 130 based on the phases and the amplitudes having been measured in steps S402 and S404, the location of the mobile station apparatus 200 having been calculated by the motion prediction function section 122, and the like. In the TDD method, the frequency of a transmitted wave and the frequency of a received wave are the same, and thus, the phases and the amplitudes having been measured in steps S402 and S404 can be accumulated as the setting value sets of the profile data as they are.

Further, in the case where the communication method of the radio communication performed by the radio base station apparatus 100a is an Frequency-Division Duplex (FDD) method, the frequency of a transmitted wave and the frequency of a received wave are different from each other, and thus, the phases and the amplitudes having been measured in steps S402 and S404 cannot be handled as the setting value sets of the profile data. In the case of the FDD method, however, the base station apparatus 100a can accumulate the profile data by performing such a process as described below. For example, the base station apparatus 100a transmits a testing signal to the mobile station apparatus 200, and the mobile station apparatus 200 transmits, to the base station apparatus 100a, a reception status of the testing signal (the location of the mobile station apparatus 200, and the phase and the amplitude of a radio wave having been received by the mobile station apparatus 200). The base station apparatus 100a accumulates the profile data based on the reception status.

Figure 6:
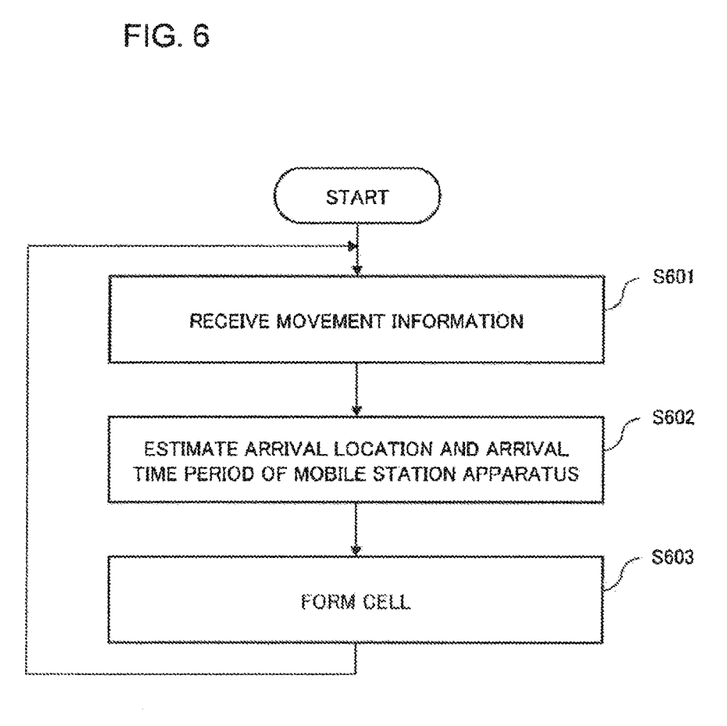
FIG. 6 is a flowchart for describing the operation of a base station apparatus that is a destination of handover.

FIG. 6 is a flowchart for describing the operation of a radio base station apparatus having received the movement information (in the following, this radio base station apparatus being assumed to be the radio base station apparatus 100b).

Firstly, in step S601, the beam forming function section 141 of the radio base station apparatus 100b receives the movement information from the radio base station apparatus 100a. Subsequently, in step S602, the beam forming function section 141 predicts whether or not the mobile station apparatus 200 will arrive at the handover region, based on the movement information. In the case where it is predicted that the mobile station apparatus 200 will arrive at the handover region, the beam forming function section 141 estimates, based on the movement information, a predicted arrival location which exists within the handover region and at which the mobile station apparatus 200 is predicted to arrive, and a predicted arrival time period to be taken until the arrival of the mobile station apparatus 200 at the handover region. Further, in step S603, the beam forming function section 141 obtains a setting value set associated with the predicted arrival location from the profile database 130, and notifies the transmitting/receiving function section 142 of the setting value set and the predicted arrival time period. Upon receipt of the setting value set and the predicted arrival time period, the transmitting/receiving function section 142 forms a cell at timing in accordance with the predicted arrival time period by adjusting the phases and the amplitudes of radio waves to be transmitted by the respective antenna elements of the antenna 110 in accordance with the setting value set.

Further, in the case where, in step S602, it is predicted that the mobile station apparatus 200 will not arrive at the handover region, the beam forming function section 141 terminates the processing. Additionally, in the case where the radio base station apparatus 100a transmits the movement information only to a base station apparatus that will become the destination of the handover, it is unnecessary to predict whether or not the mobile station apparatus 200 will arrive at the handover region.

As described above, according to the present example embodiment, the motion measurement section 120 of the base station apparatus 100a calculates a movement status of the mobile station apparatus 200, which is being served by the base station apparatus 100a, based on radio waves having been received by the antenna 110, and transmits movement information, that is, information indicating the calculated movement status, to at least one of the base station apparatuses 100b to 100g. Upon receipt of, from the base station 100a, the movement information indicating the movement status of the mobile station apparatus 200, which is being served by the base station apparatus 100a, the cell formation section 140 of each of the base station apparatus 100b to 100g forms a cell based on the received movement information using the antenna 110. Thus, a cell is formed based on a movement status of a mobile station apparatus being served by another base station apparatus, and thus, it is possible to form a cell in accordance with the beam forming method prior to the execution of the handover. Accordingly, it is possible to suppress the degradation of communication quality at the time of the execution of the handover.

Next, a second example embodiment will be described.

Figure 7:
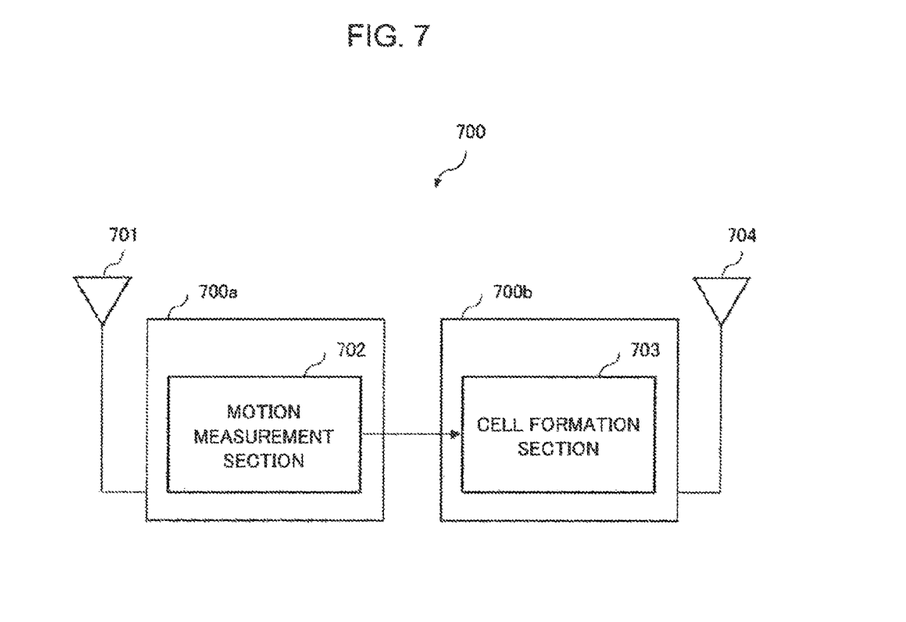
FIG. 7 is a block diagram illustrating a communication system according to a second example embodiment of the present invention

FIG. 7 is a diagram illustrating a communication system according to this example embodiment. As shown in FIG. 7, a communication system 700 includes base station apparatuses 700a and 700b. The base station apparatus 700a is a first base station apparatus, and includes an antenna 701 and a motion measurement section 702. The base station apparatus 700b is a second base station apparatus, and includes a cell formation section 703 and an antenna 704.

The antenna 701 of the base station apparatus 700a is a first antenna for receiving radio waves. The motion measurement section 702 calculates a movement status of a mobile station apparatus being served by the base station apparatus 700a based on the radio waves having been received by the antenna 701, and transmits information indicating the movement status to the base station apparatus 700b. The cell formation section 703 of the base station apparatus 700b receives the information from the base station apparatus 700a, and forms a cell based on the information using the antenna 701, which is a second antenna.

Figure 8:
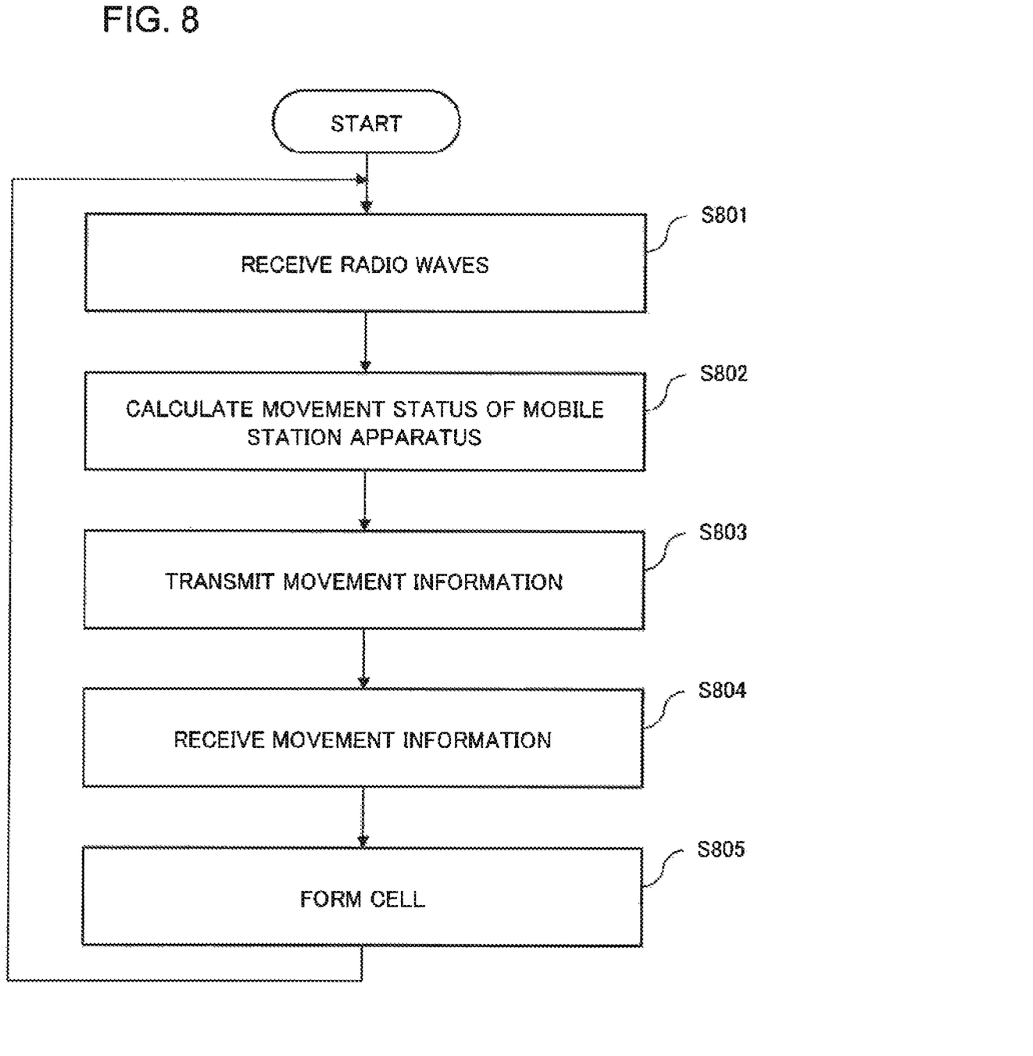
FIG. 8 is a flowchart for describing the operation of a communication system according to a second example embodiment of the present invention.

FIG. 8 is a flowchart for describing the operation of the communication system 700, according to the present example embodiment.

Firstly, in step S801, the antenna 701 of base station apparatus 700a receives radio waves. Next, in step S802, the motion measurement section 702 calculates a movement status of a mobile station apparatus being served by the base station apparatus 700a based on the radio waves having been received by the antenna 701. Further, in step S803, the motion measurement section transmits information indicating the movement status to the base station apparatus 700b.

In step S804, the cell formation section 703 of the base station apparatus 700b receives the information from the base station apparatus 700a. Further, in step S805, the cell formation section 703 forms a cell based on the information using the antenna 701.

As described above, in the present example embodiment as well, a cell is formed in accordance with a movement status of a mobile station apparatus being served by another mobile station apparatus, and thus, it is possible to form a cell in accordance with the beam forming method prior to the execution of the handover. Accordingly, it is possible to suppress the degradation of communication quality at the time of the execution of the handover.

In the individual example embodiments described above, the illustrated configurations are just examples, and the present invention is not limited to the configurations. This application is based upon and claims the benefit of priority from Japanese Patent Application No. 2015-059386, filed on Mar. 23, 2015, the disclosure of which is incorporated herein in its entirety by reference.

INDUSTRIAL APPLICABILITY

The present invention is applicable to the field of mobile communications, such as Long Term Evolution (LTE), LTE-Advanced, wireless Local Area Network (LAN), and the like.

REFERENCE SIGNS LIST 1 and 700: communication system
100a to 100g, 700a, and 700b: base station apparatus
110, 701, and 704: antenna
120 and 702: motion measurement section
121: radio wave measurement function section
122: motion prediction function section
130: profile database
140 and 703: cell formation section
141: beam forming function section
142: transmitting/receiving function section
150: base station function section
200: mobile station apparatus

The invention claimed is:

1. A base station apparatus comprising:
an antenna for receiving a radio wave; and
a motion measuring circuit configured to calculate a movement status of a mobile station apparatus being served by the base station apparatus based on the radio wave, and to transmit information indicating the movement status to another base station apparatus,
wherein the motion measuring circuit obtains, based on the radio wave, data including radio wave intensity distributions at a plurality of time points as moving image data, and calculates a motion vector of the moving image data as the movement status.

2. A communication system comprising:
a first base station apparatus according to the base station apparatus of claim 1; and
a second base station apparatus, wherein
the motion measuring circuit of the first base station apparatus is configured to calculate a movement status of a mobile station apparatus being served by the first base station apparatus based on the radio wave, and to transmit information indicating the movement status to the second base station apparatus, and wherein
the second base station apparatus includes
a second antenna, and
a cell forming circuit configured to receive the information from the first base station apparatus, and to form a cell based on the information using the second antenna.

3. A communication method for use in a base station apparatus, the method comprising:
obtaining data including radio wave intensity distributions at a plurality of time points as moving image data;
calculating a motion vector of the moving image data as a movement status of a mobile station apparatus being served by the base station apparatus based on a received radio wave; and
transmitting information indicating the movement status to another base station apparatus.

* * * * *